United States Patent [19]

Kuonen et al.

[11] Patent Number: 5,207,196

[45] Date of Patent: May 4, 1993

[54] PRE-ASSEMBLED UNIT FOR ENGINE VALVE SYSTEM

[75] Inventors: Frederick L. Kuonen, Mentor; Ronald J. Rich, Wickliffe, both of Ohio

[73] Assignee: TRW Inc., Lyndhurst, Ohio

[21] Appl. No.: 923,370

[22] Filed: Jul. 31, 1992

[51] Int. Cl.[5] .......................... F01L 3/00; B23P 19/04
[52] U.S. Cl. ............................ 123/188.17; 29/213.1; 29/214; 29/215
[58] Field of Search .......... 123/188.17, 90.1; 29/213.1, 214, 215, 249, 888.46

[56] References Cited

U.S. PATENT DOCUMENTS

| | | | |
|---|---|---|---|
| 1,212,003 | 1/1917 | Bean | 29/214 |
| 1,874,257 | 8/1932 | Doptis | 29/213.1 |
| 2,434,456 | 1/1948 | Cook | 29/249 |
| 3,065,528 | 11/1962 | Marshall | 29/249 |
| 3,793,999 | 2/1974 | Seiler, et al. | 123/90.28 |
| 4,095,324 | 6/1978 | Lawson | 29/249 |
| 4,142,282 | 3/1979 | Johnson | 29/249 |
| 4,667,388 | 5/1987 | Browning | 29/249 |
| 4,826,180 | 5/1989 | Deuring | 123/188 P |
| 5,046,463 | 9/1991 | Worsley | 123/90.67 |
| 5,072,950 | 12/1991 | Littleproud et al. | 29/213.1 |

FOREIGN PATENT DOCUMENTS 0465119 8/1971 Japan ..................... 29/214

Primary Examiner—E. Rollins Cross
Assistant Examiner—Erick Solis
Attorney, Agent, or Firm—Torolli, Sundheim & Covell

[57] ABSTRACT

A pre-assembled unit 10 for use in assembly of an engine valve system 150 in an engine 152. The pre-assembled unit 10 includes a spring 14 for providing a force for urging an engine valve 156 in a first direction, a spring seat 20 engaged with the spring 14, a spring retainer 78 for maintaining the spring 14 in a concentric position around the valve 156, and locks 82 for lockingly engaging the spring retainer 78 and the valve 156. The spring retainer 78 and the locks 82 transmit the spring force to the valve 156. The pre-assembled unit 10 includes a retention member 120 for temporarily maintaining the spring 14, the spring seat 20 and the spring retainer 78 together prior to installation into the engine valve system 150. The retention member 120 cooperates at its upper section 130 with the locks 82 and at its lower section 124 with an oil seal 22 on the spring seat 20 to hold the spring retainer 78 and the spring seat 20 in engagement with the spring 14. The retention member 120 is removable from the pre-assembled unit 10 upon relative movement of the valve 152 and the pre-assembled unit 10 during assembly of the engine valve system 150 in the engine 152.

8 Claims, 5 Drawing Sheets 5,207,196

PRE-ASSEMBLED UNIT FOR ENGINE VALVE SYSTEM

BACKGROUND OF THE INVENTION

The present invention relates to a pre-assembled unit for use in the assembly of an engine valve system in an engine.

Engine valve systems include numerous discrete elements. These valve elements are often located in a relatively inaccessible location, such as in a counter bore, or in a location obscured by other engine parts, such as a rocker arm or cam shaft support. Thus, these valve elements can become misassembled.

If a valve element becomes misassembled in an engine, the engine often must be withdrawn from the assembly line. Correction of the misassembly is wasteful economically. There exists a need for improved efficiency in installing engine valve system elements in an engine.

SUMMARY OF THE INVENTION

The present invention is a pre-assembled unit of a number of engine valve system parts. The pre-assembled unit includes a spring which, when assembled in an engine, provides a force for urging an engine valve in a first direction. The pre-assembled unit includes a spring seat. The spring engages the spring seat.

The pre-assembled unit includes a spring retainer. The spring retainer, when assembled in an engine, maintains the spring in a concentric position around the engine valve. The pre-assembled unit includes locks for lockingly engaging the valve. The spring retainer and the locks transmit the spring force to the valve. The pre-assembled unit also includes a retention member. The retention member maintains the spring, the spring seat, the spring retainer and the locks together prior to installation into an engine.

The retention member has a portion engageable with the valve during assembly of the spring, the spring seat, the spring retainer and the locks in an engine. The retention member is ejected from the pre-assembled unit upon relative movement of the valve and the pre-assembled unit during assembly of the spring, the valve spring seat, the spring retainer and the locks in an engine.

BRIEF DESCRIPTION OF THE DRAWINGS

The foregoing and other objects and features of the present invention will become more readily apparent to one skilled in the art from the following detailed description, as taken in conjunction with the accompanying drawings, in which.

DESCRIPTION OF PREFERRED EMBODIMENT

Figure 1:
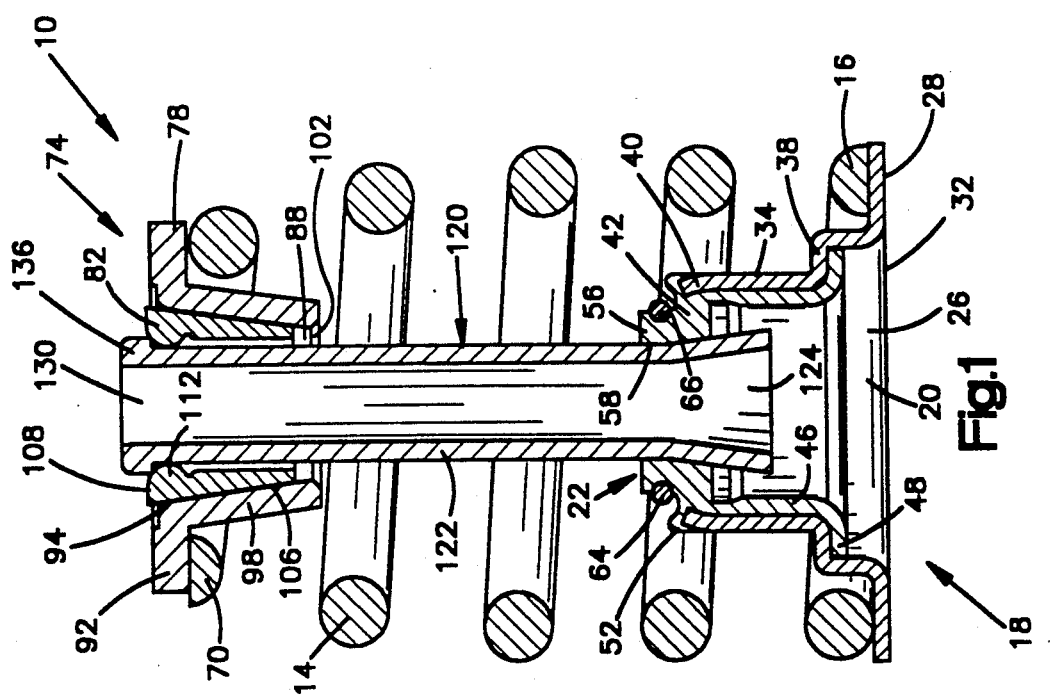
FIG. 1 is a sectional view of a pre-assembled unit constructed in accordance with the present invention.

A pre-assembled unit 10 according to the present invention is shown in FIG. 1. The pre-assembled unit 10 includes a spring 14, which is preferably a helical coil compression spring. The spring 14 is engaged at its lower end 16 to a spring seat unit 18.

The spring seat unit 18 includes a spring seat 20 and an oil seal 22 molded onto the spring seat 20. The spring seat 20 may be made of stamped metal or molded compounds and is wear resistant. The spring seat 20 has a hollow interior region 26. The spring seat 20 has a flat annular flange 28. The lower end 16 of the spring 14 is engaged with the annular flange 28.

The annular flange 28 defines a lower aperture 32 in the spring seat 20. The spring seat 20 has an upward extending annular side wall 34, which extends from the annular flange 28. The side wall 34 has at least one shoulder portion 38. The side wall 34 has an inwardly tapered section 40 at its upper end. The side wall 34 terminates at an upper aperture 42.

The oil seal 22 is preferably made of heat and oil resistant, resilient material, such as rubber. A generally cylindrical wall 46 of the oil seal 22 is received within the interior region 26 of the spring seat 20. The wall 46 of oil seal 22 has an outer diameter matching the inner diameter of the side wall 34 within the interior region 26. An annular lower lip 48 projects radially outward from the lower end of the wall 46. The lower lip 48 axially engages the under side of shoulder 38 of the spring sea 20.

The oil seal 22 further includes an upper lip 52 which extends radially over and around the tapered section 40 of the side wall 34, thus capturing the side wall 34 of the spring seat 20 between the upper and lower lips 48 and 52.

The oil seal 22 has a valve engaging portion 56 formed thereon. The portion 56 is joined to the upper lip 52 and projects axially through the upper aperture 42 of the spring seat 20. The portion 56 extends radially inwardly from the tapered section 40 of the spring seat 20. A cylindrical, axial valve receiving aperture 58 is defined in the portion 56. A metal reinforcing ring 64 surrounds the portion 56 of the oil seal 22 in an annular groove 66 in the outer diameter of portion 56.

The spring 14 is engaged at its upper end 70 with a spring retainer unit 74. The spring retainer unit 74 includes a spring retainer 78 and a pair of collet locks 82. The spring retainer 78 will usually be made of steel, but can be made of molded compound. The spring retainer 78 circumferentially surrounds and defines a hollow interior cavity 88.

The spring retainer 78 includes a flat upper annular flange 92. The upper end 70 of the spring 14 is engaged with the bottom of the annular flange 92. The annular flange 92 defines an upper aperture 94 in the spring retainer 78.

The spring retainer 78 includes an annular side wall 98. The side wall 98 extends downwardly, and tapers radially inwardly, from the annular flange 92. The side wall 98 terminates at a lower aperture 102 in the spring retainer 78. Thus, the side wall 98 has an inverted conical taper and the cavity portion 88 has the shape of a truncated, inverted cone.

The collet locks 82 are wedged into the interior cavity 88 of the spring retainer 78. The collet locks 82 are enclosed by the side wall 98 within the interior cavity 88. The collet locks 82 are each semi-circular and together annularly extend about the circumference of interior cavity 88. The collet locks 82 oppose one another along vertical lines (not shown) in a conventional manner.

Each of the collet locks 82 has a lower portion 106. The lower portion 106 is wedge-shaped in cross-section. The wedge shape tapers downwardly. The wedge shape of the lower portion 106 cooperates with the inverted conical taper of the side wall 98 to provide a radial movement of the collet locks 82 upon downward movement of the collet locks 82 relative to the spring retainer 78. Each of the collet locks 82 has an upper portion 108. Disposed on the upper portion 108 is an inwardly facing annular protrusion 112.

The pre-assembled unit 10 includes a retention member 120 for holding the pre-assembled unit 10 together. The retention member 120, which is preferably made of plastic, is hollow and includes a tubular central section 122, a flared lower section 124, and a lipped upper section 130. The retention member 120 extends between and couples together the spring seat unit 18 and the spring retainer unit 74. The retention member 120 extends through the valve receiving aperture 58 of the oil seal 22 and through the upper and lower apertures 94 and 102 of the spring retainer 78. The retention member 120 is positioned within the spring 14 and extends substantially coaxial with the spring 14.

The lower section 124 of the retention member 120 protrudes below the valve receiving aperture 58 of the oil seal 22. The outward flaring of the lower section 124 frictionally engages the valve receiving aperture 58 of the oil seal 22 of the spring seat unit 18. The upper section 130 of the retention member 120 protrudes above the spring retainer 78. The upper section 130 of the retention member 120 has an outwardly facing annular flange 136. The annular flange 136 abuts the top of the collet locks 82. Both the outward flaring of the lower section 124 and the annular flange 136 of the upper section 130 have diameters and circumferences which are greater than the diameter and circumference of the central section 122 of the retention member 120.

Figure 2:
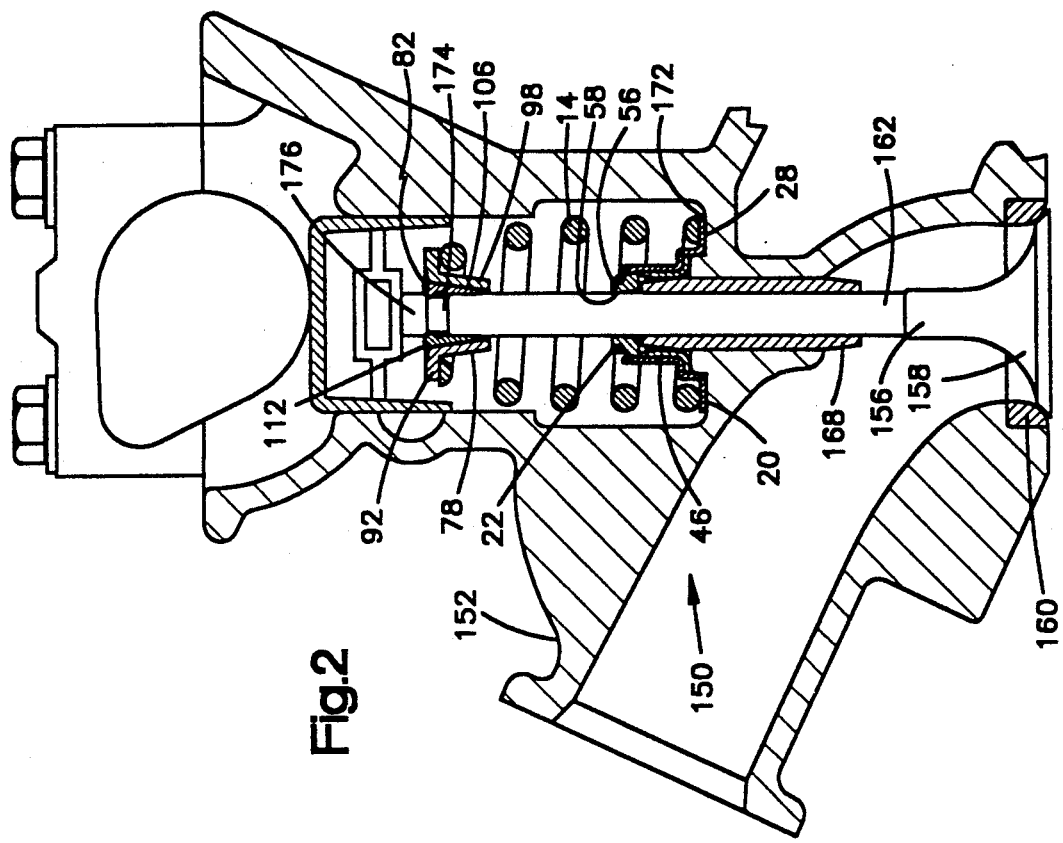
FIG. 2 is a sectional view of a part of an engine with an engine valve system installed utilizing the pre-assembled unit of FIG. 1.

The retention member 120 is sized to maintain the spring 14, the spring seat 20, the spring retainer 78 and the collet locks 82 together prior to installation of the spring 14, the spring seat 20, the spring retainer 78 and the collet locks 82 in an engine valve system 150 of an engine 152, as shown in FIG. 2. Specifically, the length of the retention member 120 (FIG. 1) is such that its lower and upper sections 124 and 130 are spaced a desired distance apart. The desired distance is the distance necessary to maintain the annular flange 136 against the top of the collet locks 82 and the outward flaring of the lower section 124 frictionally engaged with the oil seal 22. Thus, the length of the retention member 120 is such that the spring 14 maintains contact with the annular flange 28 of the spring seat 20 and the annular flange 92 of the spring retainer 78.

The annular flange 136 of the retention member 120 holds the collet locks 82 within the interior cavity 88 of the spring retainer 78. The cooperation of the wedge shape of the lower portion 106 of the collet locks 82 and the inverted conical taper of the side wall 98 move the collet locks 82 inwardly to insure that the collet locks 82 remain wedged into the interior cavity 88. The collet locks 82 transmit force between the annular flange 136 of the retention member 120 and the spring retainer element 78 to hold the spring 14 in place concentrically around the retention member 120. The oil seal 22 transmits force between the outward flaring of the lower section 124 and the spring seat 20 to hold the spring seat unit 18 in place concentric around the retention member 120.

After installation in the engine valve system 150, the spring 14, the spring seat 20, the spring retainer 78 and the collet locks 82 are positioned as shown in FIG. 2. The retention member 120 is removed from the pre-assembled unit 10 and is either discarded, or saved for use in a subsequent pre-assembled unit 10.

The engine valve system 150 (FIG. 2) includes a conventional poppet valve 156. The valve 156 has a valve head 158 for engagement with a valve seat 160. The valve 156 also has a valve stem 162 which extends through a valve guide sleeve 168.

The annular flange 28 of the spring seat 20 rests on a surface 172 of the engine 152. The wall 46 of the oil seal 22 extends around the outer diameter of guide sleeve 168. The portion 56 of the oil seal 22 annularly engages and seals against the valve stem 162, which extends through the valve receiving aperture 58. The spring 14 is concentric around the valve stem 162. The spring 14 is captured between the annular flange 28 of the spring seat 20 and the annular flange 92 of the spring retainer 78. The spring 14 is preloaded to urge the valve 156 upwardly and thus hold the valve 156 closed.

The valve stem 162 has an annular groove 174 at an upper end 176. The annular protrusion 112 of each of the collet locks 82 is received within the annular groove 174. The annular protrusions 112 and the annular groove 174 are locked together by the cooperation of the wedge shape of the lower portion 106 of the collet locks 82 and the inverted conical taper of the side wall 98 of the spring retainer 78.

Figure 3:
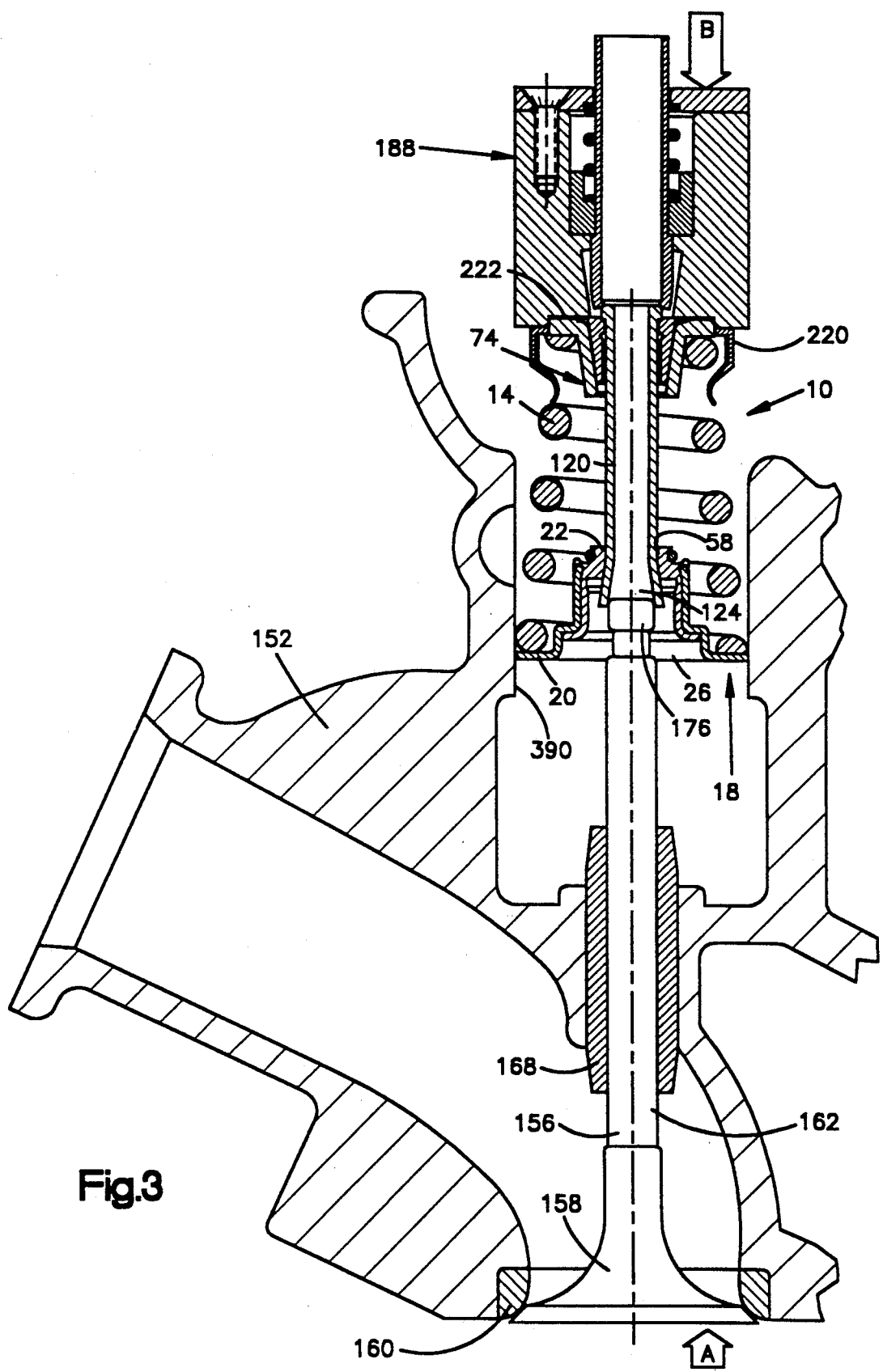
FIGS. 3-5 are sectional views showing the pre-assembled unit of FIG. 1 at various times during installation of an engine valve system in an engine.
Figure 4:
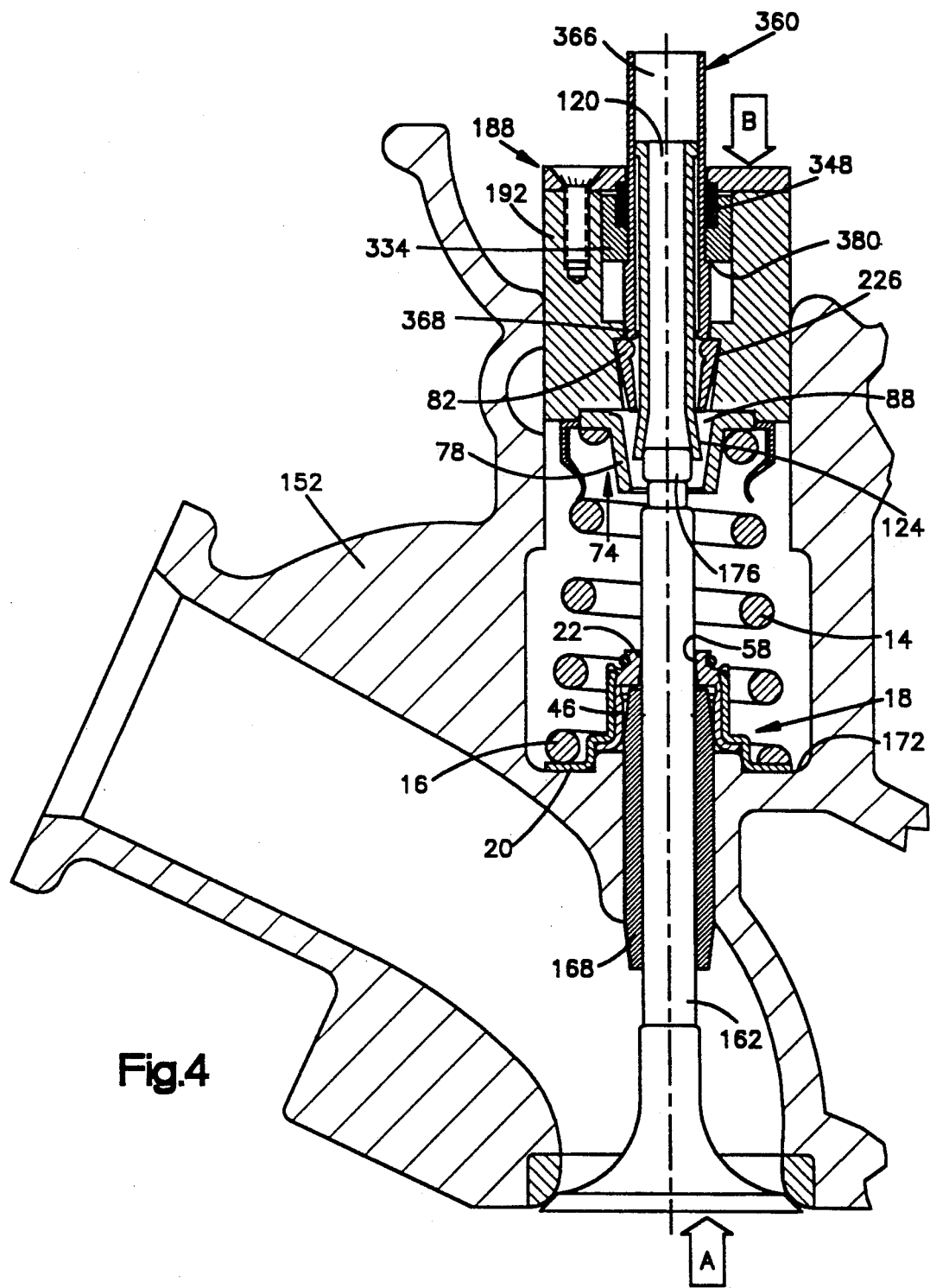
Figure 5:
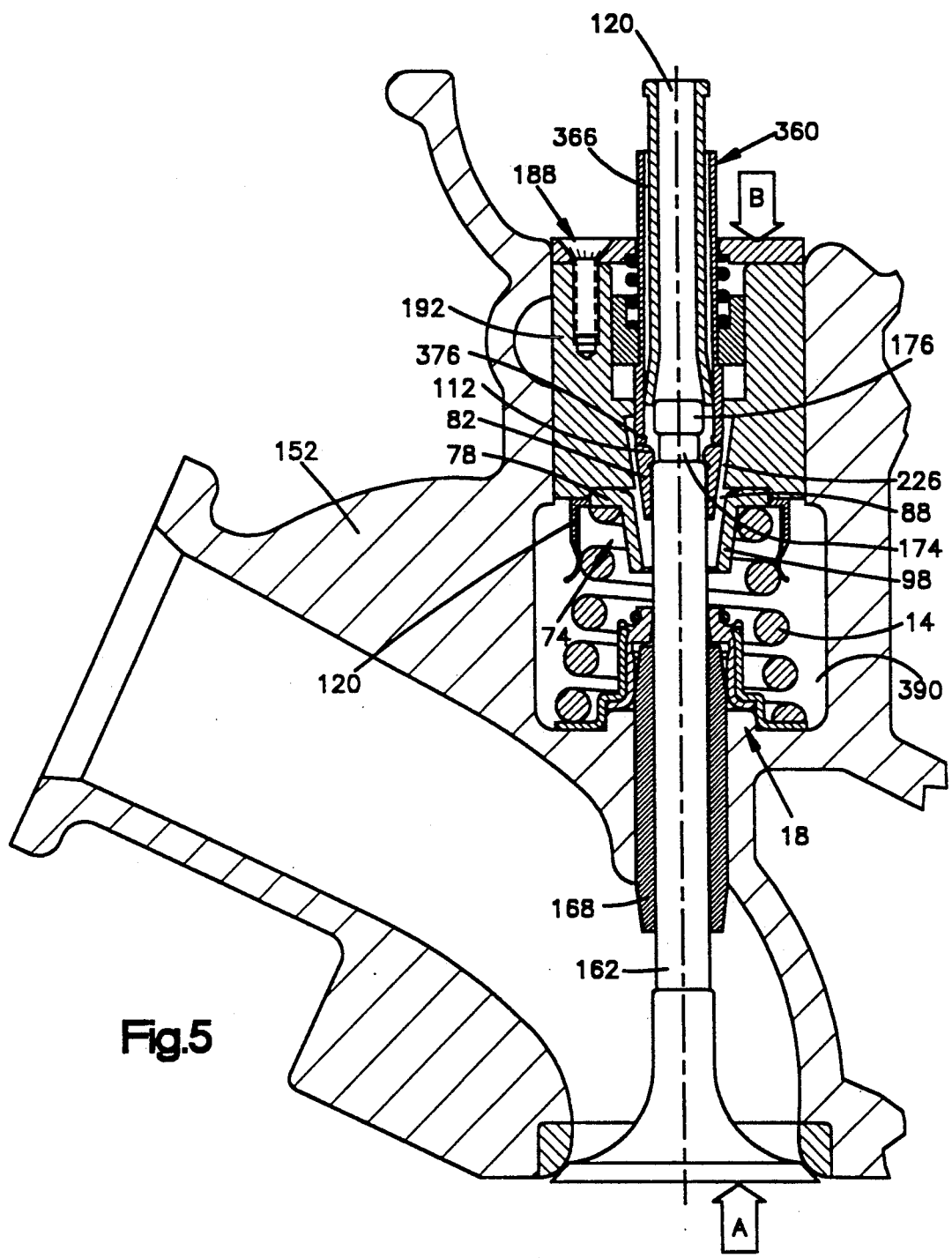
Figure 6:
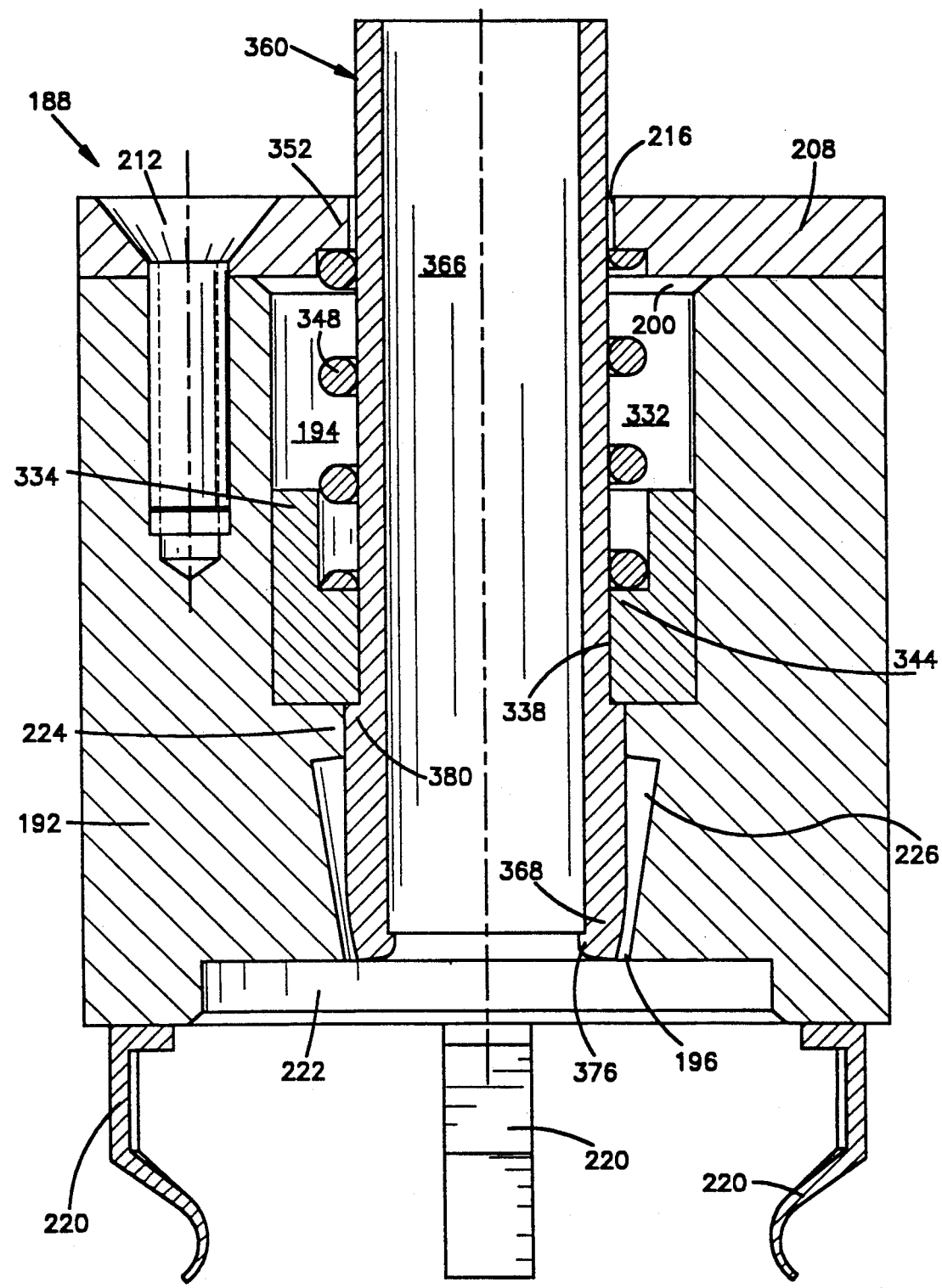
FIG. 6 is a sectional view illustrating a tool used with the pre-assembled unit of the present invention during installation of the engine valve system.

The retention member 120 (FIG. 1) of the pre-assembled unit 10 insures that the spring 14, the spring seat 20, the spring retainer 78 and the collet locks 82 are held together as a single unit prior to and during installation in the engine valve system 150 (FIG. 2 of the engine 152. During assembly of an engine valve system 150, the spring 14, the spring seat 20, the spring retainer 78 and the collet locks 82 are installed in the engine valve system 150 while the retainer member 120 is ejected from the pre-assembled unit 10 as shown in FIGS. 3-5. The installation of the spring 14, the spring seat 20, the spring retainer 78 and the collet locks 82, and ejection of the retention member 120 is aided by the use of a tool 188 shown in FIG. 6.

The tool 188 is similar to a tool described in U.S. Pat. No. 3,793,999. The tool 188 includes a cylindrical body 192 having an open interior 194. The open interior 194 has a lower aperture 196 and an upper aperture 200. The tool 188 includes a cap 208. The cap 208 is removably connected to the body 192 by removable screws 212. The cap 208 has an aperture 216. The body 192 of the tool 188 has an annular recess 222 for receiving the spring retainer 78. The tool 188 also includes spring clips 220 for holding the pre-assembled unit 10.

The open interior 194 of the body 192 has a lower chamber 226 and an upper chamber 332. An annular shoulder 224 divides the lower chamber 226 from the upper chamber 332. The upper chamber 332 is cylindrical in shape. The lower chamber 226 has the shape of a truncated, inverted cone which terminates at the lower aperture 196. The slope of the inverted cone is approximately 15° from vertical.

A piston 334 is positioned within the upper chamber 332. The piston 334 is free to slide axially within the upper chamber 332. The piston 334 has an axial bore 338. The axial bore 338 has a stepped inner diameter with the larger and smaller diameter sections meeting at a shoulder 344. A compression spring 348 extends between the shoulder 344 on the piston 334 and a shoulder 352 on the ca 208.

The tool 188 includes a generally tubular plunger 360. The plunger 360 is centrally mounted within the tool 188, extending through the lower chamber 226, the axial bore 338 of the piston 334, the upper chamber 332 and the aperture 216 of the cap 208. An inwardly facing annular flange 376 is formed around a lower end 368 of the plunger 360. The plunger 360 further has an annular shoulder 380 formed around its outer surface a short distance from the lower end 368. The shoulder 380 engages the bottom of the piston 334 adjacent the axial bore 338.

The compression spring 348 biases the piston 334 downwardly and the piston 334 in turn biases the plunger 360 downwardly. The plunger 360 is upwardly movable upon application of an upward force on the lower end 368 of the plunger 360. Upward movement of the plunger 360 moves the piston 334 upwardly against the downward bias of the compression spring 348.

During assembly of the engine valve system 150 (FIG. 2) the valve 156 is inserted through the guide sleeve 168 (FIG. 3). The valve 156 is pushed upwardly until the valve head 158 engages the valve seat 160. The valve 156 is held upwardly by a force designated by A, during assembly, such that the valve head 158 remains engaged with the valve seat 160.

The pre-assembled unit 10 is held by the spring clips 220 of the tool 188. The pre-assembled unit 10 is positioned in a bore 390 of the engine 152, such that the upper end 176 of the valve stem 162 extends into the interior region 26 of the spring seat 20 to engage the lower end 124 of the retention member 120.

A downward force is applied to tool 188, as designated by B, to push the tool 188 downwardly. The downward force B is transmitted to the spring retainer 78 which is engaged with the tool 188 at the annular recess 222. The downward force B is transmitted from the spring retainer 78, through the spring 14, to the spring seat 20. The downward force B pushes the spring seat 20, the spring 14 and the spring retainer 78 downwardly in the bore 390.

However, because the upper end 176 of the valve stem 162 is engaged with the lower section 124 of the retention member 120, the retention member 120 is prevented from moving downwardly with the spring seat 20, the spring 14 and the spring retainer 78. Thus, as the spring seat 20 is moved downwardly within the bore 390, the frictional engagement between the outward flaring of the lower section 124 of the retention member 120 and the valve receiving aperture 58 of the oil seal 22 is overcome. The retention member 120 and the oil seal 22 are relatively moved. The lower section 124 of the retention member 120 is moved upwardly, relative to the oil seal 22, out of the valve receiving aperture 58 of the oil seal 22.

The force B continues to move the tool 188 downwardly into the bore 390. With the lower section 124 of the retention member 120 out of the valve receiving aperture 58, the spring seat 20, the spring 14 and the spring retainer 78 move downwardly in the bore 390 (FIG. 4) and downwardly relative to the retention member 120. The retention member 120 is pushed into a hollow core 366 of the plunger 360 by the upper end 176 of the valve stem 162, due to the downward relative movement of the tool 188.

As the spring seat 20 is moved downwardly, the oil seal 22 is also pulled downward over and around the valve stem 162. Further downward movement causes the oil seal 22 to move down over and around the guide sleeve 168, establishing an effective seal between the valve stem 162 and the guide sleeve 168 of the engine 152.

As the spring 14 is moved down, the spring 14 is moved into a position concentric with the valve stem 162. The spring seat 20 engages the surface 172 of the engine 152, bringing the spring seat 20 and the lower end 16 of the spring 14 to their final positions.

The force B continues to move the tool 188 relatively down, causing the retention member 120 to be further ejected from the assembly by valve stem 162. In sequence, the retention member 120 moves away from the spring seat 20, moves axially out of the spring 14, and finally is ejected upward through the spring retainer 78. As the lower section 124 of the retention member 120 arrives at, and moves through the spring retainer 78, the outward flaring of the lower section 124 of the retention member 120 catches the collet locks 82. The lower section lifts the collet locks 82 out of the spring retainer 78 and axially into the lower chamber 226 of the tool 188.

As the collet locks 82 are moved upward, the collet locks 82 push on the lower end 368 of the plunger 360, forcing the plunger 360 upward within the body 192. As the plunger 360 is moved relatively upward, the annular shoulder 380 of the plunger 360 pushes upwardly on the bottom surface of the piston 334. Thus, the piston 334 is carried upward against the force of the compression spring 348.

As the collet locks 82 arrive in the lower chamber 226 of the body 192, the collet locks 82 tilt outward due to the 15° angle of the inverted conical shape of the lower chamber 226. Also, the collet locks 82 move radially outward slightly to permit the outward flaring of the lower section 124 of the retention member 120 to move upward through the lower chamber 226, past the collet locks 82 and completely into the hollow core 366 of the plunger 360 (FIG. 5).

Once the retention member 120 is completely within the hollow core 366 of the plunger 360, the annular flange 376 of the plunger 360 prevents the retention member 120 from moving downwardly, back into the bore 390 of the engine 152. Thus, the retention member 120 is completely separated and removed from the spring 14, the valve seat 20 and the spring retainer 78.

Once the retention member 120 is completely within the hollow core 366 of the plunger 360, the collet locks 82 drop, or are pushed downwardly by the plunger 360, back into the interior cavity 88 of the spring retainer 78. As the tool 188 is further moved downwardly under the force B, the spring 14 is further compressed. The upper end 176 of the valve stem 162 moves relatively upwardly through the interior cavity 88 of the spring retainer 78 and into the lower chamber 226 of the tool 188. The collet locks 82 slide downwardly relative to the valve stem 162 until the annular protrusion 112 of each of the collet locks 82 is received into the annular groove 174 of the valve stem 162. Thus, the collet locks 82 and the valve stem 162 become interlocked to prevent relative movement.

Once the annular protrusion 112 of each of the collet locks 82 is engaged with the annular groove 174 of the valve stem 162, the force B on the tool 188 is reduced. The force of the spring 14 moves the seat retainer element 78 upwardly. The collet locks 82 wedge into the interior cavity 88 of the spring retainer 78. The cooperation of the wedge-shape of the collet locks 82 and the inverted conical shape of the interior cavity 88 provide a force to move the collet locks 82 radially inwardly toward the valve stem 162. The annular protrusion 112 of each of the collet locks 82 is moved further into the annular groove 174. Thus, further upward movement of the spring retainer 78 relative to the upper end 176 of the valve stem 162 is blocked.

The tool 188 is pulled upwardly out of the bore 390 and away from the spring retainer 78. The retention member 120 is retained within the plunger 360 to be removed away from the engine 152. As the tool 188 is pulled upwardly, the spring clips 120 release the spring 14 and the spring retainer 78. Thus, the spring 14, the spring seat 20, the spring retainer 78 and the collet locks 82 are positioned within the bore 390 of the engine 152, as shown in FIG. 2, and further assembly of the engine valve system 150 can be performed. Thus, it should be realized that the use of the pre-assembled unit 10 of the present invention provides for improved speed and efficiency.

As an alternative embodiment, a unitary member with a portion for retaining the spring 14 and a portion for lockingly engaging the annular groove 124 of the valve stem 162 could be substituted for the spring retainer 78 and the collet locks 82. Also, other methods of installation of the engine valve system 150 can be utilized. In particular, the preassembly unit 10 could be positioned within the bore 390 by the tool 188. A downward force could be exerted against the tool 188 to compress the spring 14 and to hold the tool 188 down. The valve member 156 could be pushed upward, sequentially, through the guide sleeve 168, the spring seat 20, the spring 14 and the spring retainer 78. The upward movement of the valve member 156 would remove the retention member 120 and result in the same connection of the collet locks 82 to the valve stem 162 as described above.

From the above description of the invention, those skilled in the art will perceive improvements, changes and modifications to the present invention. Such improvements, changes and modifications within the skill of the art are intended to be covered by the appended claims.

Having described the invention, the following is claimed:

1. A pre-assembled unit for utilization in assembly of an engine valve system in an engine, said pre-assembled unit comprising:

a spring for providing a force for urging an engine valve in a first direction;
a spring seat engaged with said spring;
a spring retainer for maintaining said spring in a concentric position around the valve, said spring retainer being engaged with said spring;
lock means for lockingly engaging said spring retainer and the valve, said spring retainer and said lock means transmitting the force for urging between said spring and the valve; and
a retention member for maintaining said spring, said spring seat, said spring retainer, and said lock means together prior to installation in an engine, said retention member having a portion engageable with the valve, said retention member being removable from the pre-assembled unit upon relative movement of the valve and the pre-assembled unit during assembly of the engine valve system in an engine.

2. A pre-assembled unit as set forth in claim 1, wherein said spring seat includes a seal for engaging the valve, said seal means being engaged with said retention member.

3. A pre-assembled unit as set forth in claim 1, said retention member having first and second ends, said first and second ends of said retention member being engaged with said lock means and said spring seat, respectively.

4. A pre-assembled unit as set forth in claim 3, wherein said first and second ends of said retention member each have a diameter greater than a diameter of a central segment of said retention member.

5. A pre-assembled unit as set forth in claim 3, wherein said first end of said retention member includes a raised annular flange, said second end of said retention member being flared.

6. A pre-assembled unit as set forth in claim 1, wherein the valve includes a valve stem, said portion of said retention member engageable with the valve being engageable with the valve stem, said retention member being removable from said pre-assembled unit under force applied to said retention member by the valve stem upon relative movement of the valve stem and said pre-assembled unit.

7. A pre-assembled unit as set forth in claim 1, wherein said retention member has first and second end portions and a middle portion, said first and second end portions each have a greater external circumference than said middle portion.

8. A pre-assembled unit as set forth in claim 1, wherein said lock means includes collet lock members.

* * * * *